May 2, 1939.　　　　F. C. WILSON　　　　2,156,557
ELECTRIC GRILL
Filed Aug. 21, 1936　　　2 Sheets-Sheet 1
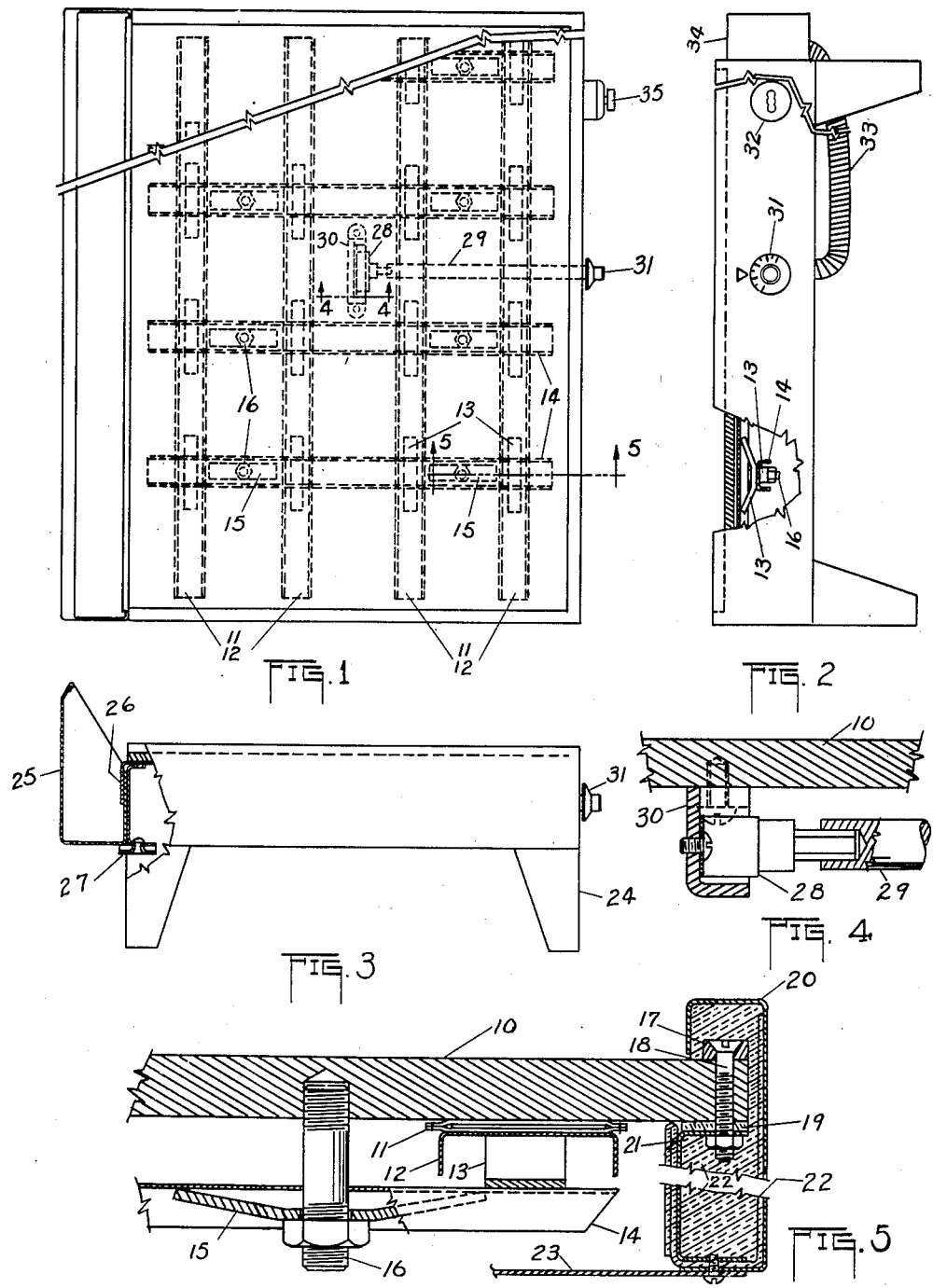
INVENTOR.
Frank C Wilson
BY Tefft & Tefft
ATTORNEY.

Patented May 2, 1939

2,156,557

UNITED STATES PATENT OFFICE 2,156,557

ELECTRIC GRILL

Frank C. Wilson, Bloomington, Ill., assignor to Servrite Mfg. Co., Bloomington, Ill., a corporation of Illinois Application August 21, 1936, Serial No. 97,112

4 Claims. (Cl. 219—19)

This invention relates to cooking grills and particularly to an electrically heated grill with thermostatic control.

The ordinary grill is usually located out of sight of the restaurant customers with ample provision for removing the smoke and odors usually resulting from the grilling process. Although the restaurateur may be meticulous in his methods there are often questions in the minds of the customers regarding the cleanliness and care exercised in the preparation of the food.

Modern merchandising of foodstuffs indicates the wisdom of displaying the complete restaurant service in plain view of the customers. This system of restaurant service requires special devices for the display and preparation of the foods.

It is the particular object of this invention to provide an electrically heated grill that is neat and sanitary in appearance and effective in operation.

Another object is to provide an electrically heated grill that has temperature adjustment within narrow limits to produce the best grilling results with the least smoke and odor.

A still further object is to insulate the grill plate proper away from all possible heat losses so as to conserve the use of the electricity as much as possible.

Another object is to provide means for maintaining the proper temperature of the grill for use at all times by automatically shutting off and turning on the electricity as required to maintain this temperature.

Another important object is to provide an aluminum grill of special aluminum alloy that will maintain a smooth and sanitary surface even when used dry to grill meats.

And a corollary object is to provide a grill to which meats may be stuck to prevent excess shrinkage without burning, and at the same time be easily and quickly removable.

And another object is to provide a grill to which may be attached a grease or waste pan which will permit effective cleaning of the grill and the removal of waste materials.

Other objects and benefits will be disclosed by the following descriptions and drawings:

Fig. 1 is a plan view; and,

Fig. 2 is a front elevation view with one section broken away to disclose the arrangement of the clamping device; and, Fig. 3 is an end elevation view with a portion of the side broken away to disclose the mounting of the grease or waste pan.

Fig. 4 is an enlarged sectional view through the thermostat and control rod in the center of the grill on the section lines 4—4 of Fig. 1.

Fig. 5 is an enlarged sectional view on the section line 5—5 of Fig. 1 showing the insulated mounting of the grill plate and the arrangement of the clamping devices on the heating element; and, Fig. 6 shows the complete wiring and electrical control system in diagram.

Figure 6:
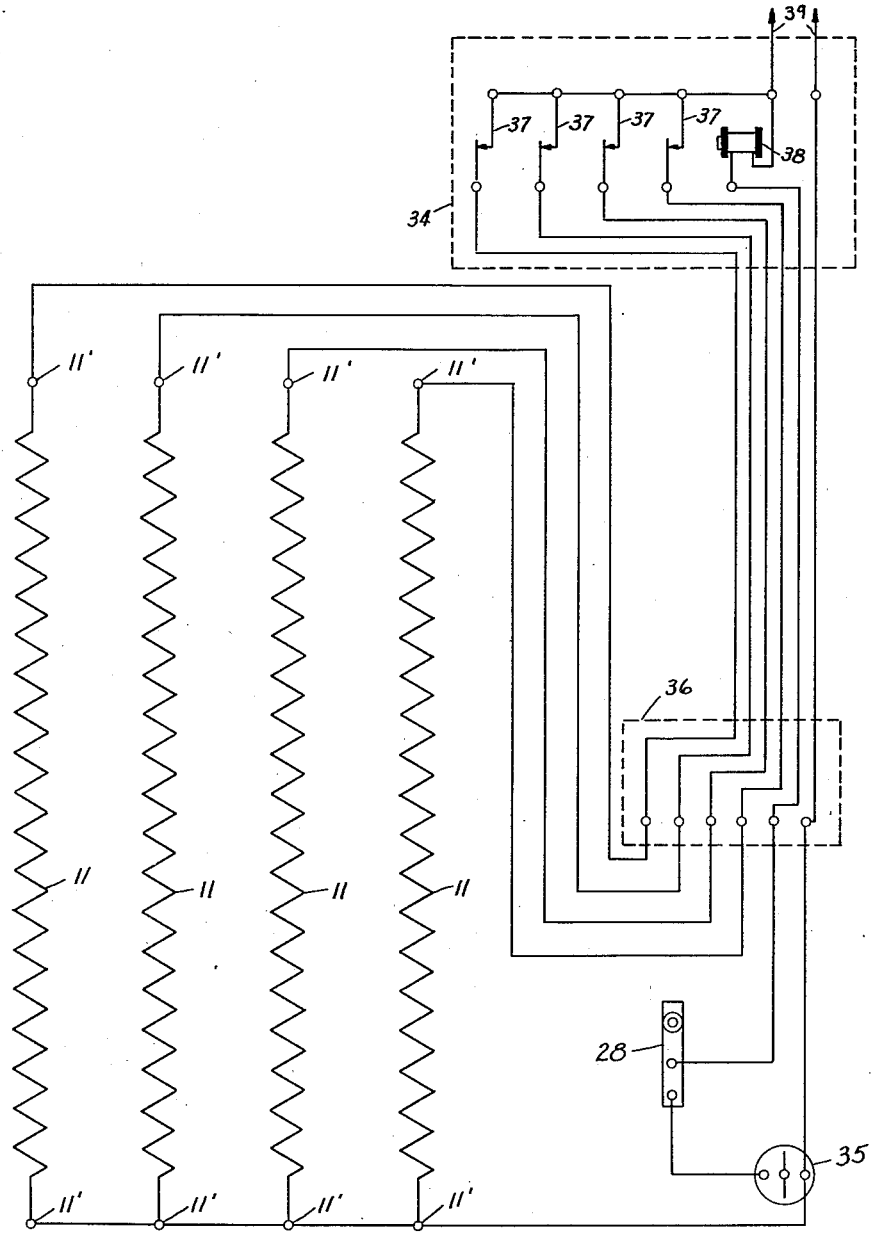

My electric grill is a novel combination of elements in which the numeral 10 indicates the aluminum alloy grill plate proper. This grill plate is a rolled sheet of aluminum alloy containing approximately 92½% aluminum, 4½% copper, .5% manganese, .5% magnesium. This alloy rolled into sheet form and heat treated makes a strong grill with a dense hard surface skin. Unlike ordinary aluminum grill plates it does not pit or flake but retains a sanitary smooth surface that is highly desirable.

This grill plate is heated by blanket type heating elements 11. These heating elements consist of a flat coil of special heat resistant steel wire containing an alloy of nickel and chromium. This flat coil of wire is completely enclosed and insulated by sheets of mica. This is a conventional heating element and further detailed description of the same is not deemed necessary.

The heating elements 11 are tightly clamped against the grill plate 10 by channel clamping strips 12 which completely cover the heating element. The clamp channels 12 are in turn held down by bridge clamps 13 and cross channel clamps 14 and bridge clamps 15 by stud bolts 16 tapped into the grill plate 10.

On the top edge of the grill plate 10, a key strip 17 is bolted by means of bolts 18. This key strip is on the front and sides of the grill plate but not on the rear, which is left open to permit the scraping of the refuse material into the grease pan 25.

Over the key strip 17, but somewhat removed from it, is the outer frame shell 20, and cooperating with the outer shell 20 is the inner shell 21 which is bolted against an insulation strip 19 by the bolt 18. Between the outer and inner shell is a strip of insulation 22 having a double thickness on the inside wall of the inner shell. Completely filling the interior of the frame, as above described, is the insulating material 22'. It will readily be appreciated that by this construction the grill plate 10 has been very effectively insulated away from the supporting frame although effectively supported thereby. The complete under surface of the grill with its clamps, wiring, and bolts, is covered by the bottom plate 23 bolted to the frame as shown.

The frame structure, as above described, which supports the grill is in turn supported by legs 24. The attachment of these legs is conventional and further description is not deemed necessary.

The grease pan 25 is attached to the back wall of the frame by means of the angle 26 and turn buttons 27. The inner wall of the grease pan 25 is retained between the vertical leg of the angle 26 and supporting frame, which not only retains the grease pan in proper position, but effectively directs the waste materials into the grease pan proper. By turning the buttons 27 at right angles to the position shown, the grease pan may be easily removed for cleaning.

In Fig. 4 is shown a conventional bimetallic thermostat 28 which is bolted into a supporting member 30, which in turn is bolted securely to the grill plate 10. It will readily be appreciated that heat in the grill plate 10 will be promptly transmitted into the supporting member 30 and thence to the thermostat 28. In effect the thermostat 28 is completely embedded in an element practically integral with the grill plate 10. The extension shaft 29 is attached to the adjustment stem of the thermostat as shown and extends to the front of the grill where it is attached to the graduated thermostat knob 31.

Although the thermostatic adjustment may be set at any desired point, for my service, I have arranged a temperature adjustment of approximately 300° F. to 500° F. The purpose of this range will later be explained.

An off and on control switch 35 is mounted beside the thermostat knob 31 to shut off or turn on the current to the grill. It will be noted that unless the grill is completely shut off by the switch 35 the grill temperature will remain at the low range of 300° F. as above described.

A conduit 33 extends from an outlet box 36 completely enclosed under the grill, and not shown, to a conventional remote control solenoid switch 34. Although I have shown this remote control switch attached to the side of my grill it will be understood that this switch would not ordinarily be so placed. Rather, it would be set on a wall or at some other convenient location away from the grill.

In Fig. 6 is shown in diagram the complete wiring of my grill. Although this wiring is as I prefer it, it will be understood that any practical wiring arrangement would be acceptable. The heating elements 11 with their terminals 11' are connected in separate circuits through the switch 35 and the thermostat 28. By this means should one of the heating elements be burned out the others will continue to operate and the lack of heat at the particular spot where the element is out will promptly be noticed by the operator and the exact repair indicated.

The outlet box 36 as above described is shown in diagram and it will be appreciated that all the wires from the outlet box 36 to the solenoid switch 34 are enclosed in the metal conduit 33. The solenoid remote control switch 34 is a conventional apparatus and will not be described in much detail. I have shown in diagram the solenoid 38 and the four separate switch contacts 37 to the four heating elements 11 and the supply wires 39. The four separate contacts 37 are of definite advantage because each contact only handles the current for a single heating element. If all of the current were to be taken through one switch contact the liability of arcing and burning would be materially increased.

I further desire to point out that the bimetallic thermostat 28 only handles the current to the solenoid coil 38. This also is of definite advantage in reducing the amount of current handled by the thermostat whereby danger of arcing and burning is reduced.

Although I have shown a conventional bimetallic thermostat operating in conjunction with a conventional remote control solenoid switch, it will be understood that I do not wish to be limited to this particular structure. Various other means of handling the thermostatic control are available,—as an example, it is quite possible to employ a single thermostat or a series of thermostats to do the complete heat control job.

Further, it will be understood that although I have shown an embodiment of my invention, I do not desire to be limited by the particular structure shown, except as within the following claims.

I now claim as new:

1. In an electric grill, an aluminum alloy grill plate, insulated supporting means for said grill, electrical heating elements clamped to said grill to heat same by conduction, and an adjustable bimetallic thermostat attached to the grill plate to regulate the temperature of the grill by stopping or starting the flow of electric current through a solenoid operated switch with unit contacts for each heating element.

2. In an electric grill, an aluminum alloy grill plate, insulated supporting means for said grill, electrical heating elements clamped to said grill to heat same by conduction, independent wiring circuits to each of said heating elements, and an adjustable bimetallic thermostat attached to the grill plate to regulate the temperature of the grill by controlling the flow of electrical current through a solenoid operated switch with unit contacts for each heating element.

3. In an electric grill, an aluminum grill plate, a bottom plate substantially coextensive in area with that of the grill plate, a key strip cooperating with the top surface of the grill plate adjoining its front and side edges, insulating material enclosing said key plate and the adjacent edges of the grill plate, complementary shells enclosing said insulating material, means penetrating said key plate and the body of one of said shells for fixing said key plate and shell on said grill plate, and means penetrating overlapping portions of said shells through which the bottom plate is secured in spaced relation to the underside of said grill plate, and heating elements enclosed within the space between said bottom plate and the underside of said grill plate.

4. In an electric grill, an aluminum grill plate, a bottom plate substantially coextensive in area with that of the grill plate, a key strip cooperating with the top surface of the grill plate adjoining its front and side edges, a removable grease pan cooperating with the rear edge of said grill plate, insulating material enclosing said key plate and the adjacent edges of the grill plate, complementary shells enclosing said insulating material, means penetrating said key plate and the body of one of said shells for fixing said key plate and shell on said grill plate, and means penetrating overlapping portions of said shells through which the bottom plate is secured in spaced relation to the underside of said grill plate, and heating elements enclosed within the space between said bottom plate and the underside of said grill plate.

FRANK C. WILSON.